United States Patent [19]

Jacobs

[11] Patent Number: 4,505,185
[45] Date of Patent: Mar. 19, 1985

[54] THROUGH-SHAFT ENERGY CONVERTER TRANSMISSION

[75] Inventor: Stephan J. Jacobs, Eureka, Calif.

[73] Assignee: Power-Train, Inc., Eureka, Calif.

[21] Appl. No.: 367,702

[22] Filed: Apr. 12, 1982

Related U.S. Application Data

[63] Continuation-in-part of Ser. No. 245,787, Mar. 20, 1981, abandoned.

[51] Int. Cl.³ .................. F01B 13/04; F16D 11/04; F16D 13/40
[52] U.S. Cl. .................. 91/491; 192/110 S; 91/473; 417/319
[58] Field of Search .......... 92/3; 91/55; 417/313, 417/319; 97/491, 492, 497; 192/110 R, 110 S, 0.096, 3 R, 3 N

[56] References Cited

U.S. PATENT DOCUMENTS

| | | | |
|---|---|---|---|
| 1,938,338 | 12/1933 | Jimerson | 192/0.096 |
| 2,147,334 | 2/1939 | De Boysson | 417/319 |
| 2,725,961 | 12/1955 | Maurer | 192/0.096 |
| 2,823,777 | 2/1958 | Banker | 192/110 S |
| 3,010,405 | 11/1961 | Tomell | 91/491 |
| 3,038,575 | 6/1962 | Hanson | 192/85 CA |
| 3,086,477 | 4/1963 | Ruhl | 91/487 |
| 3,122,971 | 3/1964 | Russell | 91/205 |
| 3,179,016 | 4/1965 | Thorton-Trump | 91/496 |
| 3,274,898 | 9/1966 | Faisander | 91/491 |
| 3,587,401 | 6/1971 | Johansson | 91/186 |
| 3,760,691 | 9/1973 | Kleckwer | 91/492 |
| 3,961,562 | 6/1976 | Kersten | 91/492 |
| 4,098,083 | 7/1978 | Carman | 60/414 |
| 4,100,840 | 7/1978 | Bosch | 91/498 |
| 4,223,532 | 9/1980 | Shiber | 60/414 |

FOREIGN PATENT DOCUMENTS

| | | | |
|---|---|---|---|
| 126601 | 1/1948 | Australia | 91/498 |
| 1816662 | of 0000 | Fed. Rep. of Germany | 91/492 |
| 1233393 | 10/1960 | France | 91/482 |
| 1242381 | 8/1971 | United Kingdom | 91/492 |
| 1285698 | 8/1972 | United Kingdom | 91/491 |
| 1299442 | 12/1972 | United Kingdom | 91/492 |
| 1399596 | 7/1975 | United Kingdom | 91/491 |

OTHER PUBLICATIONS

North American Hydraulics, Inc.-"Hollow Shaft Piston Motors", Publication No. G-3500-11-76.

Primary Examiner—William L. Freeh
Attorney, Agent, or Firm—Townsend and Townsend

[57] ABSTRACT

An energy converter transmission uses a throughshaft clutch and a through-shaft energy converter for transfer of energy to and from a shaft. The energy converter includes a housing and a rotor mounted to a hollow coupling shaft. The energy converter can be an hydraulic, a pneumatic or an electric energy converter. A first clutch element is also mounted to the coupling shaft. A second clutch element is mounted to the main drive shaft which passes through the hollow coupling shaft. Actuation of the clutch engages the clutch elements to couple the main drive shaft to the rotor via the clutch and coupling shaft.

2 Claims, 8 Drawing Figures

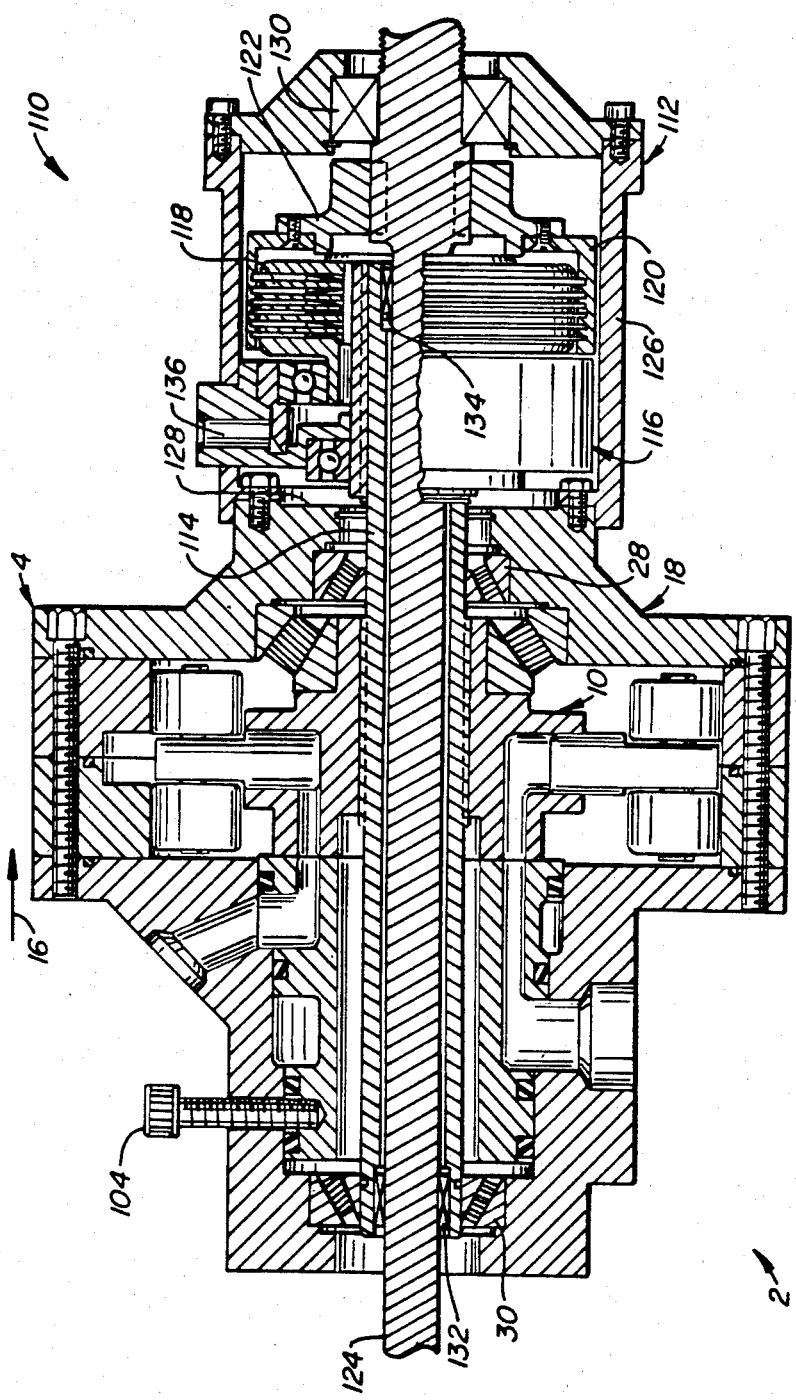
FIG._7.

THROUGH-SHAFT ENERGY CONVERTER TRANSMISSION

This is a continuation-in-part of my earlier filed application Ser. No. 245,787, filed Mar. 20, 1981, for RADIALLY BALANCED CONTINUOUSLY VARIABLE ROTARY PUMP MOTOR now abandoned.

BACKGROUND OF THE INVENTION

It is often desired to transfer energy to or from a rotating shaft. One method of doing so is with various types of energy converters. These energy converters are typically hydraulic or pneumatic rotary machines having either radial or axial pistons. The energy converter may also be an electric motor/generator. In any event the energy converter has the ability to allow the user to selectively draw energy from or supply energy to the rotating shaft from an energy reservoir.

Energy converters are often used in regenerative kinetic energy systems for vehicles. These systems typically interrupt the power flow from the engine to the wheels using a variety of clutches and hydraulic, pneumatic or electric motors. Therefore, the prior art energy converter transmissions introduce increased transmission losses even when the engine is driving the wheels directly since true direct drive is not possible.

One type of rotary machine commonly used has radial pistons and can be used as either a motor or a pump. The fluid flow between the radially extending cylinders is often provided through a pintal type valve which is essentially a hollow shaft with two or more ports for intermittent communication with passageways to the various cylinders. See, for example, U.S. Pat. Nos. 1,302,709 to Ragot, et al. and 2,163,080 to Benedek. One problem with pintal valves is that as the surfaces wear, the fit becomes looser and the valves tend to leak. Therefore rotary machines having pintal valves are generally disfavored for use with high pressures, such as are encountered in regenerative drive systems, because of a short life.

In order to overcome the disadvantage of the pintal valves in rotary machines, face valves have been used by some. In face valves the valves' mating surfaces are typically flat and define a plane perpendicular to the axis of rotation of the rotor of the machine. If wear occurs, one or both of the two members can be biased to take up the slack so that leaks are minimized. See U.S. Pat. Nos. 2,525,498 to Naylor et al. and 3,122,971 to Russell. However the Naylor patent is directed to a machine having only two openings in its fluid distribution plate; the axial forces therefore will not be balanced so that early failure of the machine may occur. Russell is a fixed displacement type of machine in which in order to reverse the direction of rotation, it is necessary to reverse the direction of flow of the fluid.

An aspect of rotary machines which should be recognized is that the driving interface between the motor and pistons is along the side of the cylinder walls. When acting as a rotary motor, the pistons drive the rotor by pressing on the cylinder walls with their sides; when the machine is acting as a pump the cylinder walls of the rotor press on the sides of the pistons. In either case it is desireable that the pistons be substantially enclosed or supported over their entire strokes to reduce force concentrations. However, this factor perhaps has not been fully appreciated in the prior art designs. See, for example, U.S. Pat. Nos. 2,189,773 to Benedek and 2,303,685 to Eden et al.

Other features of rotary machines disclosed in the prior art include eliptical tracks shown in U.S. Pat. No. 3,123,013 to Ganahl; the patent to Eden discloses a machine having means for inversely varying speed and torque and having the ability to reverse the direction of rotation by reversing the flow of the fluid; the device disclosed in the patent to Ragot can change the direction of rotation by changing the relative orientation of the ports.

SUMMARY OF THE INVENTION

The present invention combines many of the somewhat disparate but desirable features of prior art rotary machines in a novel but practical and workable way to yield a machine which can be used for heavy duty application, is rugged but simple of construction and is versatile in its application. The rotary machine of the invention, being a through-shaft type of pump motor, is particularly suited for use with a through-shaft clutch to provide a through-shaft energy converter transmission for use with a continuous main drive shaft.

A fluidic, typically hydraulic, pump motor which is radially balanced, reversible, continuously adjustable, and uses face valves for intermittent communication with radially extending pistons in the rotor is disclosed. The pump motor (or machine) includes a housing and has a drive shaft extending completely through the housing. One end of the housing, called a forward end, encloses the rotor.

The rotor has a number of radially extending cylinders therein. Pistons are supported within these cylinders and each has a pair of rollers mounted at its outer end for engagement with a multiple lobed, typically oval, track. The other, or rear, end of the housing houses a fluid distribution member.

The distribution member has a pair of annular fluid pathways for carrying either high pressure or low pressure fluid to openings in the distribution member. The distribution member and the rotor abut along a valve face plane perpendicular to the axis of the drive shaft. Each cylinder communicates with a corresponding port in the rotor valve face. For a two lobed, oval track the distribution member valve face contains four equally spaced openings. The rotor preferably has six, eight or ten pistons. Diametrically opposed openings in the distribution member communicate with the same high pressure or low pressure fluid pathway. This insures that the radial forces on the rotor and drive shaft are balanced.

The fluid pathways carrying the fluid to and from the openings in the distribution member are configured and bounded by both the fluid distribution member and the housing. By the appropriate configuration of the fluid pathways, the net annular area of the walls of the pathways within the distribution member facing rearward is greater than the net annular area facing forward. This is possible by using a portion of the housing to define some of the the forward facing anular areas of the pathways. Since the distribution member is mounted within the housing with an allowance for some axial play, the internal pressures within the pathways results in a net forward force on the distribution member against the rotor valve face. Depending upon various factors, such as the leakage which can be tolerated, the amount of wear which can be tolerated, the amount of friction tolerable between the valve faces, and the pressures expected to be encountered within the fluid pathways, an appropriate difference in annular areas can be chosen for the particular application. The greater sealing forces required to be generated at higher pressures are automatically provided by a machine made according to the present invention.

In order to assure that the side wall forces exerted between the pistons and the cylinders do not become concentrated at single points, the rotor has radially extending, partial cylinder portions at the outer end of the cylinder. These portions allow the entire length of the piston to be laterally supported over substantially the entire stroke of the piston in the cylinder. The outer, partially exposed portion of the pistons are configured so that rollers can be mounted adjacent the outwardly extending partial cylinder portions of the rotor. The rollers, mounted to either side of the piston, engage the multiple-lobed track.

Apparatus made according to the present invention can be used with a drive shaft which extends completely through the machine. This allows for its conventinet use along a drive train—a definate advantage in a regenerative drive system. The through-shaft energy converter of the invention may be used in conjunction with a through-shaft clutch permitting maximum efficiency during direct drive, minimum size and simple operation.

The configuration of the rotor to include radially extending partial cylinder portions in conjunction with the appropriately configured piston and rollers mounted to the piston ensures that the piston is supported over essentially its entire stroke. This reduces cocking, reduces stress concentrations on the walls of the pistons and cylinders and promotes longer life for the unit.

Other features and advantages of the present invention will appear from the following description in which the preferred embodiment has been set forth in detail in conjunction with the accompanying drawings.

BRIEF DESCRIPTION OF THE DRAWINGS

FIG. 7 is a side cross-sectional view of the rotary machine of FIG. 2 with a through-shaft clutch assembly mounted to the front plate of the housing.

DETAILED DESCRIPTION OF THE PREFERRED EMBODIMENT

Figure 1:
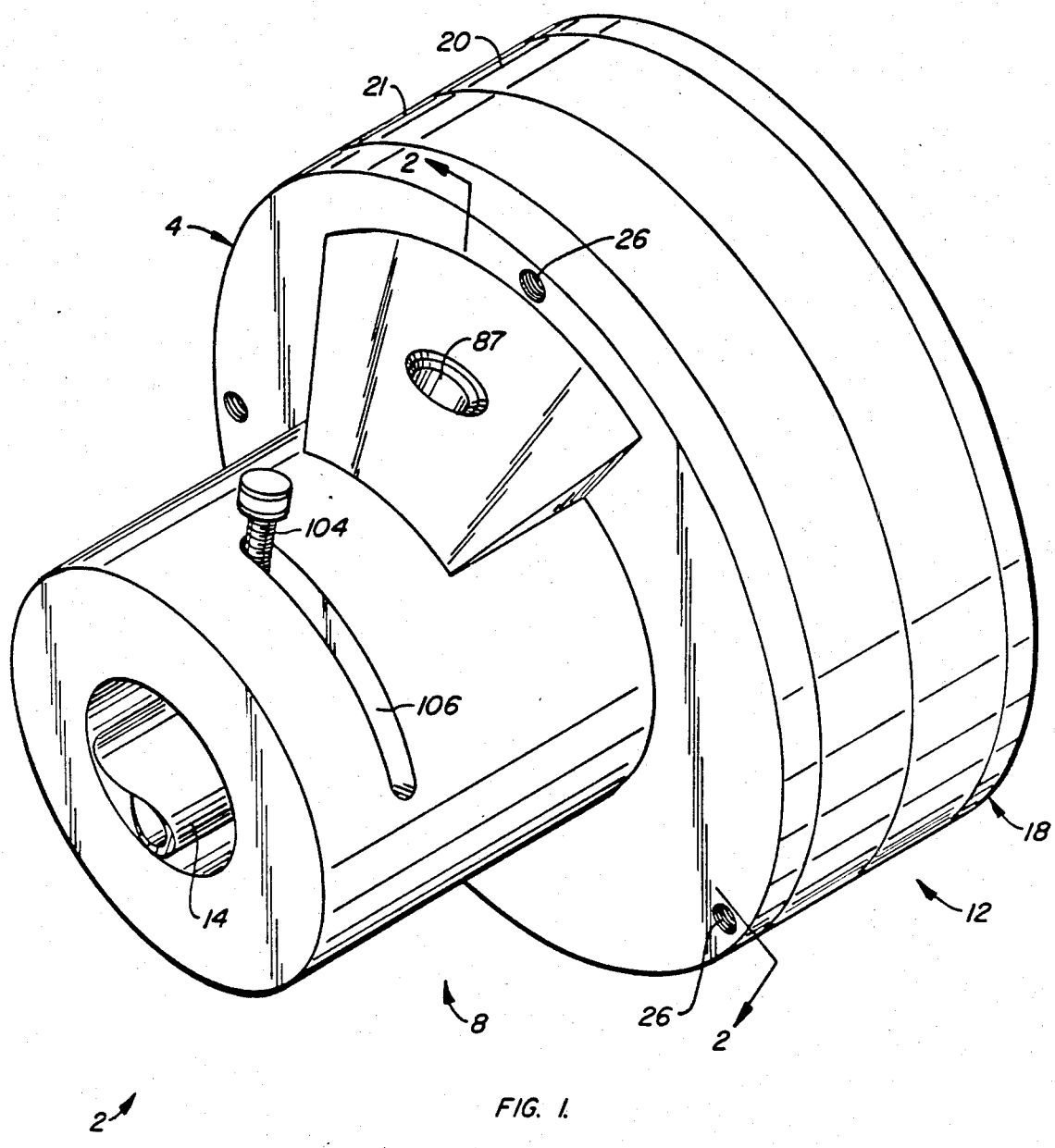
FIG. 1 is an isometric view of the rotary machine according to the present invention.
Figure 2:
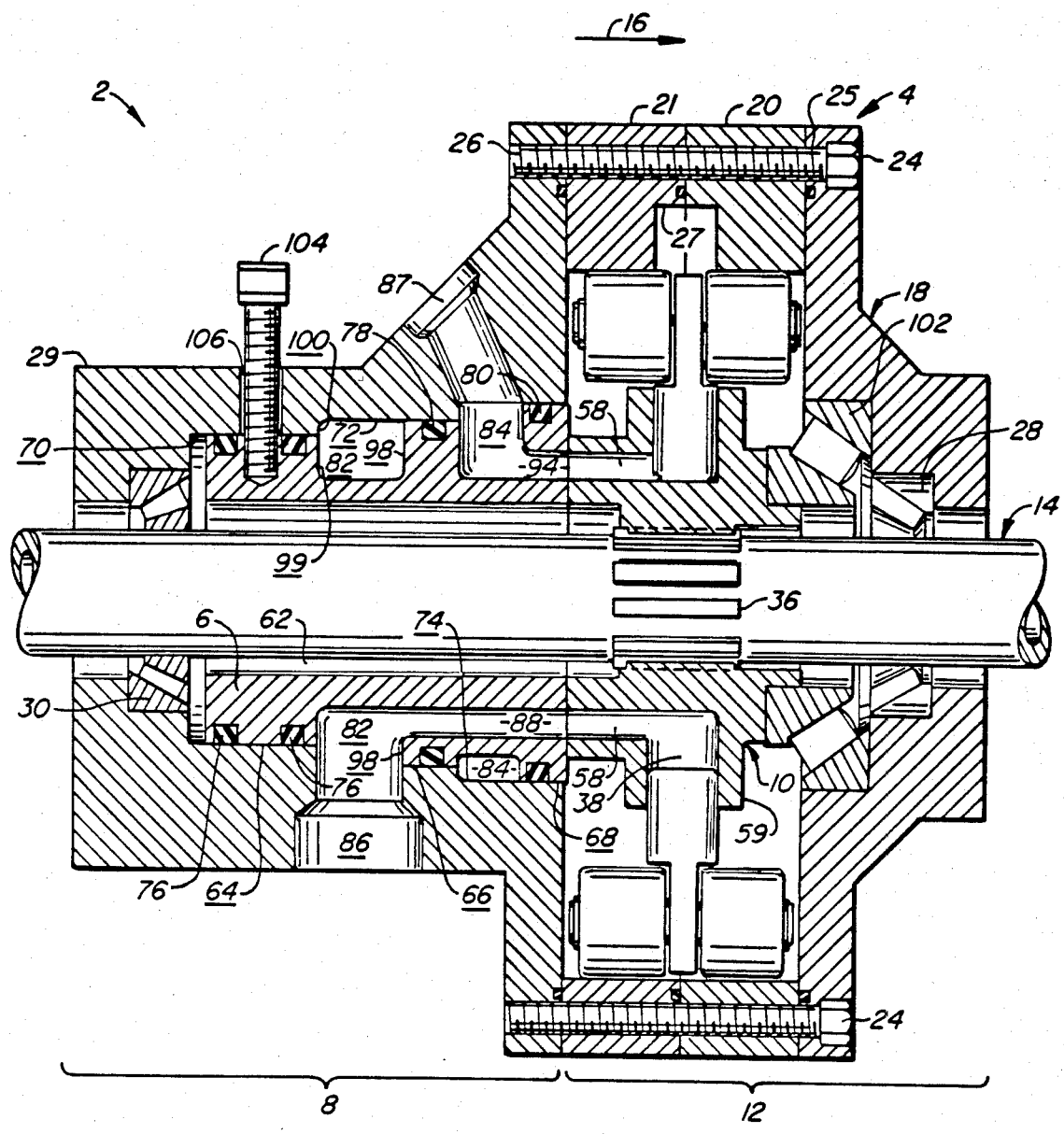
FIG. 2 is a sectional view of the machine of FIG. 1 taken along the lines 2—2.

Turning now to FIGS. 1 and 2, rotary machine 2 of the present invention includes generally a housing 4, a fluid distribution member 6 mounted within the rear end 8 of housing 4, a rotor 10 housed within the forward end 12 of housing 4. A drive shaft 14, splined to rotor 10, passes through housing 4.

Figure 5:
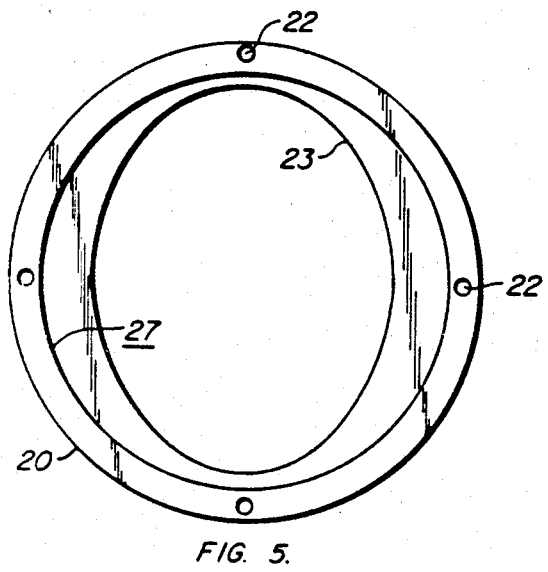
FIG. 5 is a reduced size front view of one of the track members of FIG. 2.

In this application front or forward will mean in the direction of arrow 16 while rear or rearward will mean in the direction opposite arrow 16. Forward end 12 of housing 4 includes a front plate 18 and a pair of track members 20, 21. Track member 20 is shown in FIG. 5 and includes four clearance holes 22 for the passage of four bolts 24 therethrough. Bolts 24 pass freely through clearance holes 25 within front plate 18 and clearance holes 22 within track members 20, 21, and then threadably engage appropriately placed threaded holes 26 in rear end 8 of housing 4.

Figure 3A:
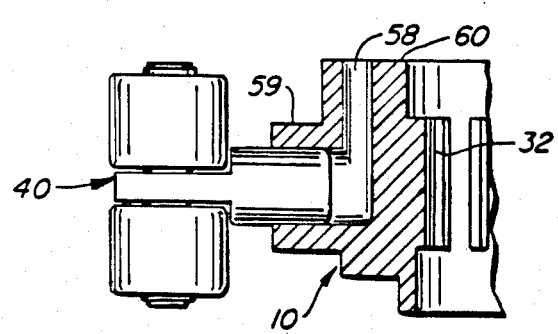
FIG. 3A is a partial cross-sectional view taken along lines 3—3 of FIG. 3.
Figure 6:
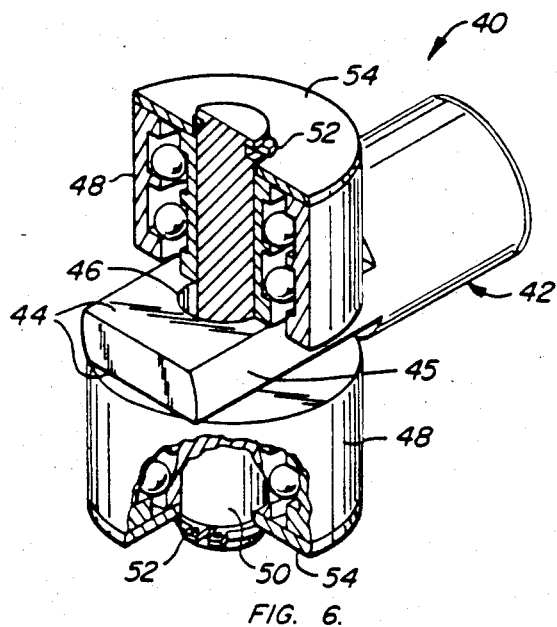
FIG. 6 is an isometric view of a roller piston assembly.

Drive shaft 14 is supported within front plate 18 by a bearing 28 and at the rearward end 29 of rear end 8 by a bearing 30. Rotor 10, shown best in FIG. 3, has splines 32 formed within its central bore 34 for engagement with the splined surface 36 of drive shaft 14. Rotor 10 includes eight evenly spaced cylinders 38. The cylinders each carry a roller piston assembly 40, shown best at FIGS. 3A and 6.

Assembly 40 includes a piston 42 having a pair of parallel flats 44 formed at the outer end 45 of pistons 42 and having a hole 46 passing centrally through flats 44. A pair of piston rollers 48 are supported against flats 44 by pin 50. Snaprings 52 keep thrust washers 54 against rollers 48.

Figure 3:
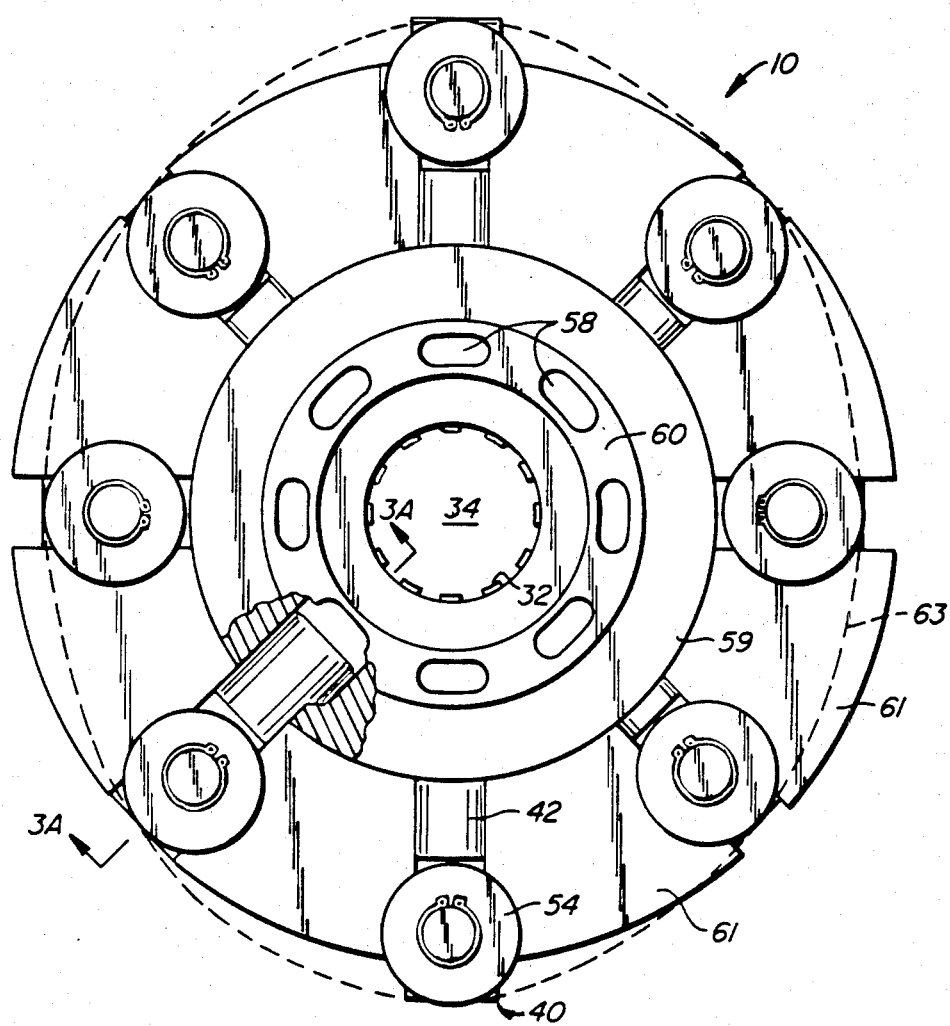
FIG. 3 is an front view of the rotor of FIG. 2.

FIG. 3 shows rotor 10 with eight roller piston assemblies 40 mounted within eight cylinders 38. Each cylinder 38 within rotor 10 communicates with a port 58 in a rotory valve face 60. These ports are arranged symmetrically about bore 34 and provide the interface at which fluid communication with fluid distribution member 6 is made. The rotor includes a cylinder defining portion 59 and web-like partial cylinder portions 61. Partial cylinder portions 61 extend radially outwardly centrally from portion 59 to provide lateral support for piston 42. Portions 61 are approximately the same thickness as the distance between flats 44. Thus, the piston is supported laterally over almost its entire stroke thereby reducing stress concentrations.

Track members 20, 21 seen best in FIGS. 2 and 5, are ring-like members having a circular inner surface 27 and an oval or eliptical track 23. The outline of track 23 is shown in dashed lines 63 in FIG. 3. Surface 27 provides clearance for outer end 45 of piston 42 while rollers 48 engage track 23. Provision of a track with an even number of lobes (in this case two) and pistons (in this case eight) insures that the radial forces on drive shaft 14 are balanced.

In certain applications it may be desirable to use an odd number of pistons, such as seven or nine. The radial forces would not be perfectly balanced, but the other benefits may outweigh this drawback.

Figure 4:
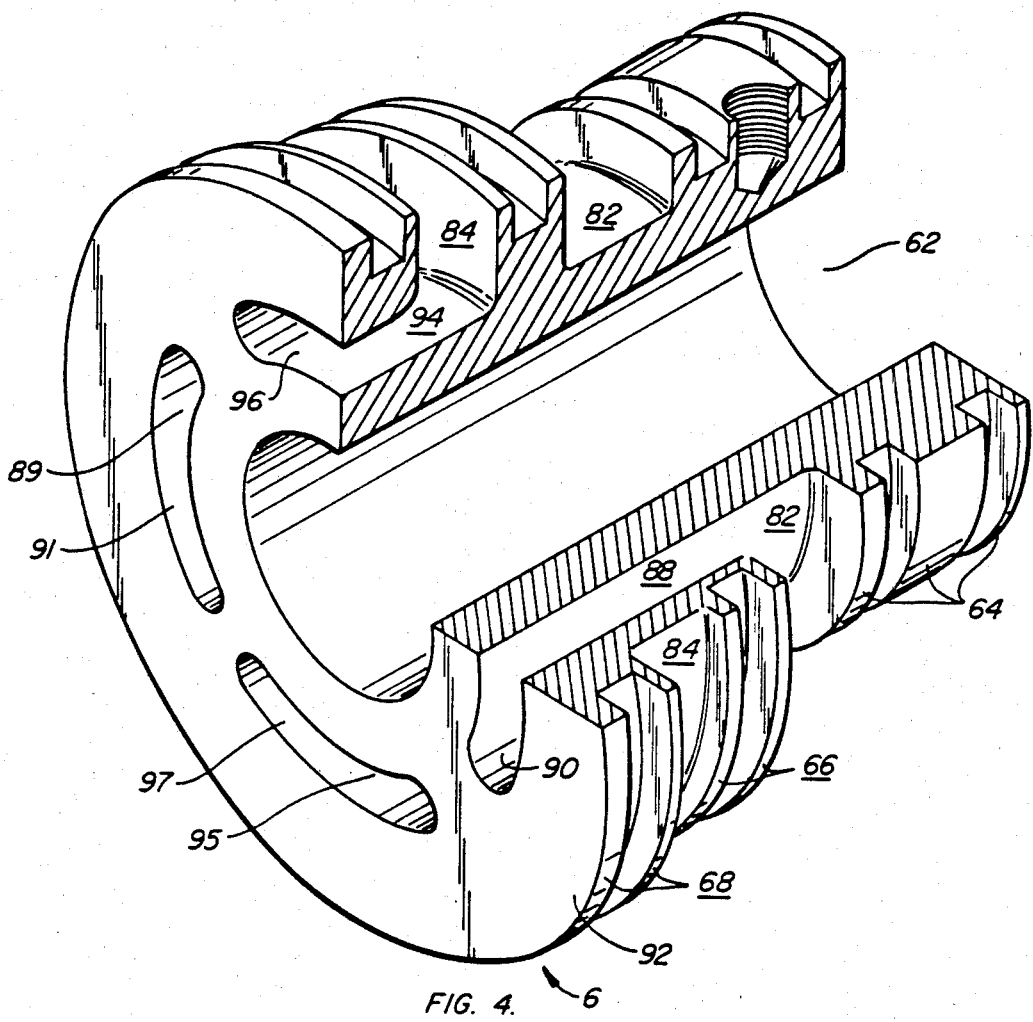
FIG. 4 is an enlarged sectional isometric view of the fluid distribution member of FIG. 2.

With references primarily to FIGS. 2 and 4, fluid distribution member 6 will now be described in some detail. Member 6 includes a central bore 62 through which drive shaft 14 passes. The outer circumferential surface of member 6 is divided into three sealing surfaces 64, 66, and 68. These sealing surfaces are of three different diameters, surface 68 being the largest and surface 64 the smallest. Interior surfaces 70, 72, 74 of rear end 8 are complementarily sized for mating engagement with sealing surfaces 64, 66, and 68. Resilient seals 76, 78 and 80 provide rotatable fluidic seals between corresponding interior surfaces and sealing surfaces.

A pair of annular fluid pathways 82, 84 are defined by distribution member 6 and interior surfaces 72 and 74. Pathway 82 fluidly connects with a low pressure opening 86 while pathway 84 communicates with a high pressure opening 87 within rear end 8 of housing 4.

Pathway 82 has a pair of axial passageways 88, 89 in communication with diametrically opposed low pressure openings 90, 91 in the rotary valve face 92 of member 6. Likewise, pathway 84 communicates with a pair of axially extending passageways 94, 95 which terminate at high pressure valve openings 96, 97 in valve face 92.

The cross-sectional view in FIG. 2 illustrates the effect of the stepped configuration of member 6 on the net annular fluid pressure area. The pressure forces of the fluid acting within pathway 82 in a forward direction is resisted by an annular surface 98 of member 6. Forces in a rearward direction are resisted by an annular surface 99 of member 6 and also by an annular surface 100 of rear end 8 of housing 4. Since annular surface 98 is larger than annular surface 99, a net force on member 6 will be exerted in the direction of arrow 16. A net axial force in the direction of arrow 16 is produced in a like fashion by pathway 84. Thus, by appropriately sizing member 6 and passageways 82, 84, 88, 89, 90 and 91, a net forward axial force can be exerted by a member 6, through rotary valve face 92 and against rotary valve face 60 of rotor 10. Regardless of normal wear between face valves 92 and 60, the proper fluid seal is maintained. Increasing fluid pressures automatically provide increased sealing forces between the valve faces. The axial thrust produced on rotor 10 is absorbed by a thrust bearing 102 mounted in front plate 18.

Openings 90, 91, 96 and 97 in distribution member 6 can be rotatably shifted about the axis of drive shaft 14 relative to the eliptical track 23 of track members 20, 21. To do so member 6 is rotated by moving a lever 104 along a slot 106 in rear end 8 of housing 4. Because track 23 is a two-lobed track, slot 106 needs to extend over approximately a 90° arc in order to allow a full range of speed in either direction. In other words, when lever 104 is at one end of slot 106, machine 2 will operate in a first direction at maximum torque. As the lever is rotated towards the center of slot 106, the speed is increased but the torque is reduced. When lever 104 is located centrally within slot 106, a neutral position is attained. Continued movement past the center causes the machine to rotate in a second direction.

Although the operation of the rotary machine of the present invention should now be apparent, its use will be described briefly. Drive shaft 14 is centered within housing 4 by bearings 28, 30. Splined surface 36 of shaft 14 engages splines 32 within bore 34 of rotor 10. Assuming the machine is acting as a pump, drive shaft 14 rotates rotor 10 and draws in low pressure fluid through opening 86, fluid pathway 82, axial passageways 88 and 89, and into cylinders 38 within rotor 10. As the drive shaft turns rotor 10, the fluid within the cylinders is forced out of the cylinders by the pistons, through ports 58, past openings 96 or 97, through passageways 94 or 95, into pathway 84 and out high pressure opening 87.

Turning now to FIG. 7, the through-shaft energy converter transmission 110 of the invention is disclosed. Transmission 110 includes generally through-shaft rotary machine 2 and a through-shaft clutch assembly 112 mounted to front plate 18 of rotary machine 2. Rotor 10 of rotary machine 2 is splined to a hollow, coaxial coupling shaft 114 in lieu of drive shaft 14 disclosed in FIG. 2. Shaft 114 extends in forward direction 16 past front plate 18. A through-shaft clutch 116, such as that manufactured by Formsprag Company of Warren, Mich., as Model ST-D-450 is mounted to the outer surface of shaft 114. The clutch elements 118 of clutch 116 are nonrotatably coupled to shaft 114 typically through a splined or keyed connection. A second clutch element 120, such as Model No. D-545800 also manufactured by Formsprag Company, is bolted an annular adapter 122 which itself is splined to an axial main drive shaft 124.

Through-shaft clutch assembly 112 also includes a casing 126 bolted to the forward face 128 of front plate 18. Bearings 130, mounted at the forward end of casing 126, and bearings 132, 134, mounted between main drive shaft 124 and coaxial coupling shaft 114 at the ends of shaft 114, ensure that main drive shaft 124 remains centered within coupling shaft 114. Clutch 116 includes an actuation port 136 extending through a hole in casing 126.

In use, power is normally transmitted along main drive shaft 124 without the need to go through any sort of hydraulic, pneumatic, electric or mechanical coupling. This insures the highest efficiency during normal use. If it is desired to connect the main drive shaft 124 with rotor 10, a pressure is applied to actuation port 132 causing clutch elements 118 and 120 to engage so that main drive shaft 124, coupling shaft 114 and rotor 10 rotate together. Depending upon the requirements, through-shaft rotary machine 2 can act either as a pump or a motor and either withdraw energy from or supply energy to main drive shaft 124. Transmission 110 economically provides maximum efficiency in a relatively small space. This arrangement is thus very well suited for use in regenerative drive vehicles, such as the type using a pneumatic accumulator which stores the braking energy of the vehicle for subsequent use.

Modification and variation can be made to the disclosed embodiment without departing from the subject of the invention as defined by the following claims. For example, other types of through-shaft energy converters, such as axial piston rotary pump motors, pneumatic rotary machines or electric motor/generators, may be used in lieu of through-shaft rotary machine 2. As used in this application, the term energy converter includes all such machines.

I claim:

1. A through-shaft energy converter transmission for use along a main drive shaft comprising:
    a through-shaft energy converter including a housing;
    a hollow coupling shaft mounted for rotation about its axis within said housing, adapted for passage of the main drive shaft therethrough and extending from a first end of said housing;
    said through-shaft energy converter including:
        a rotor fixed to said coupling shaft for rotation therewith, said rotor having a plurality of radially extending pistons mounted within corresponding cylinders formed in said rotor;
        a plurality of ports formed in said rotor fluidly connecting each said cylinder with a rotor valve surface of said rotor, said rotor valve surface being perpendicular to the axis of the main drive shaft;
        a multiple-lobed track mounted to said housing and centered radially about said rotor;
        means attached to the radially outermost portions of said pistons for moveably engaging said track;
        fluid distributing means mounted in said housing for providing paths for higher and lower pressure fluids for intermittent communication with said ports through openings formed in a distributor valve surface of said fluid distributing means, said distributor valve surface disposed perpendicular to said axis, said fluid distributing means including a first pathway communicating with first and second said openings in said distributor valve face and a second pathway communicating with third and fourth said openings in said distributor valve face, said first second, third and fourth openings evenly spaced about said axis with said first and second openings diametrically opposed and said third and fourth openings diametrically opposed; and means for selectively orienting said openings and said track relative to one another about said axis thereby allowing the speed of operation and direction of rotation of said rotor to be continuously varied;

a through-shaft clutch mounted over a portion of said coupling shaft extending from said first end, said clutch including a first clutch element fixedly coupled to said coupling shaft and a second clutch element fixedly coupled to the main drive shaft;

means for positioning said main drive shaft within said coupling shaft; and said clutch including means for selectively engaging said first and second clutch elements thereby operably coupling the main drive shaft to said energy converter.

2. A through-shaft energy converter transmission for use along a main drive shaft comprising:

a through-shaft energy converter including a housing;

a hollow coupling shaft mounted for rotation about its axis within said housing, adapted for passage of the main drive shaft therethrough and extending from a first end of said housing;

said through-shaft energy converter including:

a rotor fixed to said coupling shaft for rotation therewith, said rotor having a plurality of radially extending pistons mounted within corresponding cylinders formed in said rotor;

a plurality of ports formed in said rotor fluidly connecting each said cylinder with a rotor valve surface of said rotor, said rotor valve surface being perpendicular to the axis of the main drive shaft;

a multiple-lobed track mounted to said housing and centered radially about said rotor;

means attached to the radially outermost portions of said pistons for moveably engaging said track;

fluid distributing means mounted in said housing for providing paths for higher and lower pressure fluids for intermittent communication with said ports through openings formed in a distributor valve surface of said fluid distributing means, said distributor valve surface disposed perpendicular to said axis, said fluid distributing means including a first pathway communicating with first and second said openings in said distributor valve face and a second pathway communicating with third and fourth said openings in said distributor valve face, said openings spaced about said axis; and means for selectively orienting said openings and said track relative to one another about said axis thereby allowing the speed of operation and direction of rotation of said rotor to be continuously varied;

a through-shaft clutch mounted over a portion of said coupling shaft extending from said first end, said clutch including a first clutch element fixedly coupled to said coupling shaft and a second clutch element fixedly coupled to the main drive shaft;

means for positioning said main drive shaft within said coupling shaft; and said clutch including means for selectively engaging said first and second clutch elements thereby operably coupling the main drive shaft to said energy converter.

* * * * *